United States Patent [19]
Molnau, deceased et al.

[11] 3,734,193
[45] May 22, 1973

[54] SUGAR BEET HARVESTER

[76] Inventors: Erwin P. Molnau, deceased, late of Chanhassen, Minn.; by Margaret L. Molnau, administratrix, Route 5, Box 171, Excelsior, Minn. 55331

[22] Filed: Sept. 20, 1971

[21] Appl. No.: 181,972

[52] U.S. Cl. .................................................. 171/57
[51] Int. Cl. ............................................. A01d 25/04
[58] Field of Search ..................... 171/57, 32, 101, 171/36, 61, 37

[56] References Cited
UNITED STATES PATENTS

| | | |
|---|---|---|
| 1,273,756 | 7/1918 | Fanger .................................... 171/57 |
| 1,668,157 | 5/1928 | Kopitke et al. ......................... 171/57 |
| 2,595,340 | 5/1952 | Diethelm ................................ 171/57 |
| 2,418,575 | 4/1947 | Christiansen .......................... 171/57 |

Primary Examiner—Antonio F. Guida
Attorney—H. Dale Palmatier

[57] ABSTRACT

A beet harvesting machine with inclined rotary beet-digging points traveling beneath the ground surface for uplifting beets from the ground; inclined screws behind the points receiving, elevating and conveying the beets rearwardly; rotary helicoidal rods above the screws guiding the beets rearwardly; ground travel wheels supporting the digging points at desired depths of penetration; release gates adjacent the screws; and drive means for the screws and rotary helicoidal rods.

7 Claims, 4 Drawing Figures

PATENTED MAY 22 1973
3,734,193
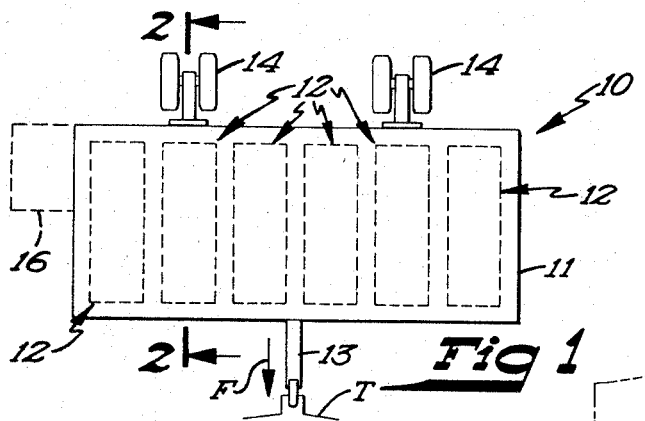
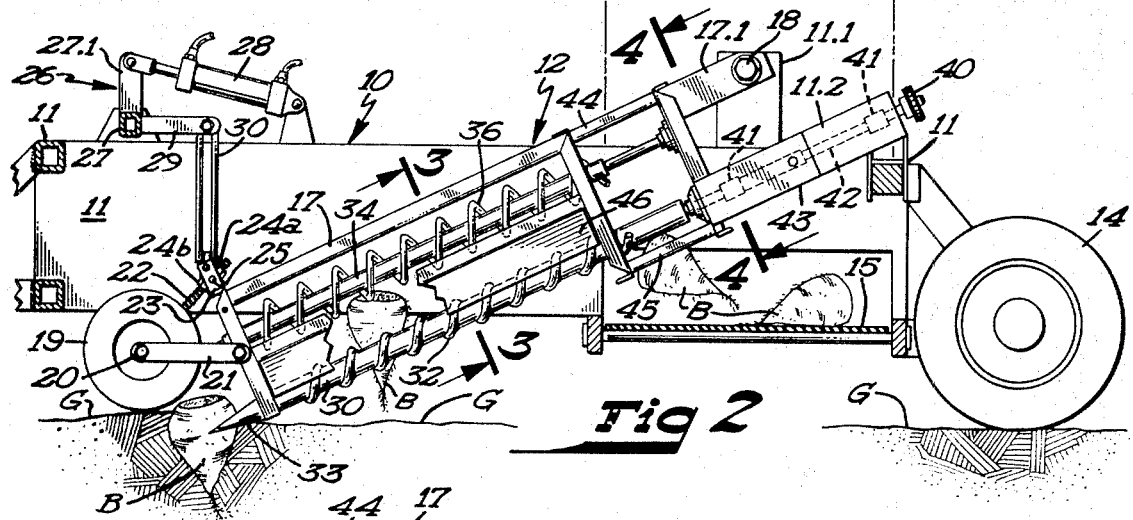
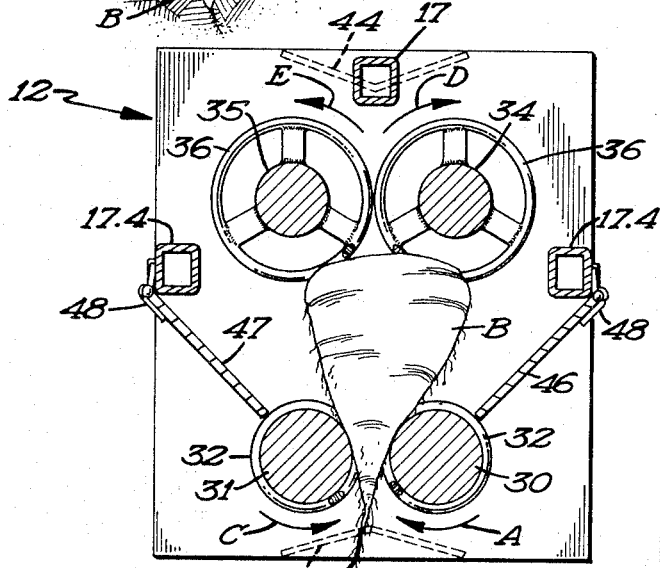
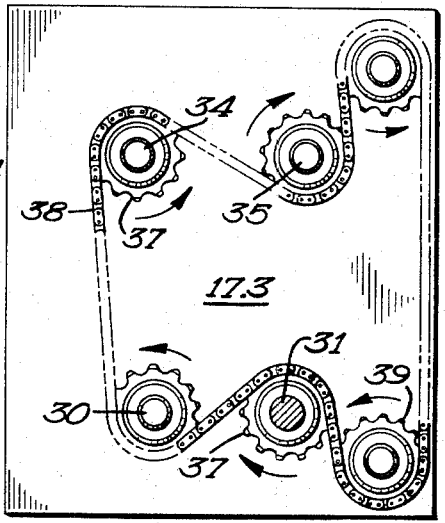
INVENTOR.
MARGARET L. MOLNAU,
administratrix of the
estate of
ERWIN P. MOLNAU,
deceased
BY H. Dale Palmatier
ATTORNEY

SUGAR BEET HARVESTER

BRIEF SUMMARY OF THE INVENTION

At the time sugar beets are ready for harvesting, the top of the beet usually protrudes above the ground surface and the foliage of the beet plant protrudes upwardly therefrom. In preparing the beets for harvesting, it is common to cut the top of the beet off at a uniform height from the ground surface and this cutting will remove a part of the top of the beet as well as all of the foliage. The beets to be harvested remain in the ground in rows; and oftentimes there is considerable moisture in the ground so that a substantial amount of dirt is likely to cling to the beets when they are removed from the ground. This removal of dirt and clods is a substantial problem in connection with beet harvesting, and of course it is desirable to handle the beets relatively gently so as to avoid any excessive damage.

The present invention lifts the beets out of the ground by a pair of digging points which are generally cone shaped and project downwardly and obliquely forwardly beneath the ground surface so as to engage the lower portion of the downwardly tapering beet in the ground. These rotary digging points lift the beets by virtue of their forward motion and by virtue of their rotary motion, and these digging points revolve in such a direction that both of the rotary points tend to uplift the beets and prevent any binding or excessive damage of the beets by virtue of this rotary motion. The present invention has a pair of screws, immediately behind the digging points, to cradle and elevate and convey the beets in a rearward direction. The beets are retained in their generally upright orientation; and a pair of helicoidal rods on upper shafts above the screws engage and guide the upper portions of the beets in a rearward direction without allowing the beets to tip over and so as to also cause and permit a substantial proportion of the dirt and clods to fall from the harvested beets.

The digging points are maintained at a preset depth of penetration by guide wheels supporting the front end of the harvesting unit and rolling along the ground surface, immediately adjacent the beets being harvested. The harvesting unit may be uplifted from the ground to be adapted for travel from one field to another, as along a highway.

The helicoidal guide rods and the screws on the screw shafts carry the beets upwardly to a position where they may be dropped onto a collecting conveyor for delivery to a storage or hauling medium.

BRIEF DESCRIPTION OF DRAWINGS

FIG. 1 is a somewhat diagrammatic top plan view of the beet harvester illustrating the general arrangement of the individual harvesting units within the supporting structure and also illustrating the general position of elevator and truck loading structure which is relatively unimportant to the present invention;

FIG. 2 is a detailed section view taken at approximately 2—2 in FIG. 1;

FIG. 3 is an enlarged detail section view taken approximately at 3—3 in FIG. 2; and FIG. 4 is an enlarged detail section view taken approximately at 4—4 in FIG. 2.

DETAILED DESCRIPTION OF THE INVENTION

One form of the invention is illustrated in the drawings and is described herein. The beet harvesting machine is indicated in general by the numeral 10 and has a supporting structure or main frame 11 which is sufficiently large to extend across a multiplicity of rows of beets in the field, and, accordingly, the supporting structure 11 carries a plurality of harvesting units 12, all of which are substantially identical to each other and which are illustrated in FIG. 1 in dotted lines to show their relative position with respect to each other.

The supporting structure 11 has a draft connection 13 to the drawbar of a tractor indicated by the letter T in FIG. 1. The front of the supporting structure is physically supported by the tractor T in the form illustrated.

The supporting structure 11 also includes a plurality of ground travel wheels 14 mounted at the rear of the supporting structure as illustrated in FIG. 1.

The supporting structure 11 carries a conveyor 15 which travels transversely of the forward direction of travel which is indicated by the arrow F and passes beneath the rear end portions of all of the harvesting units 12 to act as a collector for the beets which have been harvested; and the conveyor 15 delivers the collected beets to an elevator and truck-loading apparatus which is indicated in general by numeral 16. The elevator and truck-loading apparatus 16 is not regarded as an important portion of the invention disclosed in the present application.

Each of the harvesting units 12 includes an elongate frame 17 oriented in a fore and aft direction within the supporting structure 11 to travel along one of the rows of beets B. The frame 17 is supported at its rear end on the supporting structure 11 by pivot bolts 18 which connect the frame element 17.1 to upright frame plates 11.1 which are rigid with the supporting structure 11. The frame 17 is thereby mounted to the supporting structure 11 for vertical swinging movement at the rear end of the frame 17.

The front end of each of the frame 17 is supported by a pair of side by side rubber-tired ground travel gauge wheels 19 mounted on a common axle 20. The axle 20 of each pair of wheels 19 is connected by a pair of parallel and spaced links 21 to the front uprights 17.2 of the frame 17. The axle 20 is also connected by a threaded rod 22 to a bracket 23 on the frame 17 so as to retain the wheel 19 against upward and downward swinging relative to the frame 17 and thereby hold the frame 17 in a predetermined relation with the ground surface G as the wheels 19 travel along the row of beets.

The threaded rod is adjustable with respect to the bracket 23 and has a pair of locknuts 24a and 24b on opposite sides of a collar pivoted within the bracket and on pivots 25 so that by loosening and tightening and manipulating the nuts 24a and 24b, the threaded rod 22 may be adjusted longitudinally through the bracket 23, thereby changing the position of the wheels 19 with respect to the frame 17.

As the harvester 10 is moved through the field, the individual harvesting units 12 may move upwardly and downwardly relative to each other and as required, depending upon the ground surface contours of the particular row along which each harvesting unit 12 is moving. The wheels 19 of each harvesting unit will follow the surface of the ground and will move upwardly and downwardly in accordance with the ground contour; and, accordingly, the front end of the frame 17 will follow, precisely, the exact contour of the ground.

The harvester 10 is provided with a lifting apparatus 26 for simultaneously raising all of the harvesting units 12 off the ground so that the harvester 10 may be moved from one field to another, as along a highway. The lifting apparatus includes a shaft 27, constructed of square tubing and extending transversely across the supporting structure in superposed relation with all of the harvesting units 12; and opposite ends of the shaft 27 are journaled in suitable bearings or bushings on the supporting structure 11. Upright links 27.1 at opposite ends of the shaft 27 are rigidly affixed to the shaft 27 and are connected to extendible and retractable hydraulic cylinders 28 to control the orientation of the shaft. Crank arms 29 are connected to the shaft 27 at each of the harvesting units 12, and each of the crank arms has a depending slotted link 30 pivoted thereto and connected to the bracket 23 of the respective harvesting unit. It will be seen that as the hydraulic cylinders are extended, the front end of the frames 17 of the several harvesting units are raised off the ground, and, of course, the ground wheels 19 are also raised off the ground into highway travel position.

Each of the harvesting units 12 has a pair of juxtaposed beet-carrying and conveying shafts 30 and 31 journaled in bearings on the frame 17 in side by side relation to each other. The shafts 30 and 31 have screws 32 on the periphery thereof formed of round rod material. The screws 32 lie directly on the peripheries of the shaft and are affixed thereto as by welding. As illustrated in FIG. 2, the screws extend rearwardly along the shafts 30 and terminate in spaced relation with the rear shaft bearings. The forward ends of the shafts 30 extend through the forward shaft bearings and have digger points 33 affixed thereon to extend forwardly and obliquely downwardly into the ground. The two digger points 33 of each harvesting unit respectively travel on opposite sides of the row of beets B so as to cooperate in engaging and lifting the beets from the ground. These digging points 33 rotate with shafts 30 and 31 and in the direction of arrows A and C; it will be noted that the shafts 30 and 31 and their respective digger points turn in opposite directions so as to tend to lift the beets B and minimize the damage by abrasion to the beets.

Each of the harvesting units 12 also includes another pair of shafts 34 and 35 spaced above the shafts 30 and 31 and journaled in bearings on the frame 17. The shafts 34 and 35 carry helicoidal guide rods 36 which are affixed to the respective shafts 34 and 35 and are spaced outwardly therefrom so as to effectively provide a beet-guiding screw on each of the shafts 34 and 35 to hold the beets in an upright position and allow the dirt and mud clods to fall from the beets during travel along the harvesting unit. The helicoidal rods 36 also terminate short of the rear end of the shafts 34 and their respective bearings to release the beets and permit them to fall and be discharged from the conveying shafts.

Each of the shafts 30, 31 and 34, 35 extend through the rear frame plate 17.3 at the rear of the harvester frame 17, and each of these shafts has a chain sprocket 37 affixed thereon. The sprockets 37 are interconnected with each other by a drive chain 38 wrapped around the several sprockets in the manner illustrated in FIG. 4 so as to cause the shafts 30 and 31 to revolve in the direction of arrows C and A, respectively, and as to cause the shafts 34 and 35 to revolve in the direction of arrows D and E, respectively. Idler sprockets 39 also guide the chain 38 in order to cause the chain 38 to effectively engage all the sprockets 37 with a sufficient number of teeth. The idler sprockets 39 are journaled on the frame plate 17.3. The shaft 31 supplies the power to the chain 38 for delivery to the other shaft, and power is supplied to the shaft 31 from a chain and sprocket mechanism extending across the rear of the supporting structure and supplied with rotary power from the power takeoff assembly of the tractor T. The chain and sprocket assembly is carried in a subframe 11.2 and is connected to the shaft 31 by a pair of universal joints 41 at opposite ends of a telescoping or extendible and retractable splined shaft 42 which is confined within a telescoping housing 43.

A pair of upper and lower connecting plates 44 and 45 are disposed above and below the rear ends of the several beet carrying and guiding shafts to direct mud and clods off to the side and to prevent undesired upward and downward movement of the beets in this area of the shaft.

The harvesting unit 12 has a pair of elongate confining gates 46 and 47, each extending along the lower shafts 30 and 31, respectively, and diverging outwardly and upwardly therefrom. The upper longitudinal edges of the gates 46 and 47 are connected by spring-biased hinges 48 to the frame members 17.4 and are continuously urged inwardly to the position illustrated in FIG. 3 so as to confine the beets in the vicinity of the screws 32. In the event of a buildup of clods of mud above the shafts 30 and 31 the gates 46 and 47 may swing outwardly to relieve the pressure and avoid any breakage of the parts of equipment in this area.

It will be seen that the invention includes a new and novel harvesting unit wherein digger points progressively travel through the ground on opposite sides of the beet row at a predetermined depth to uplift and then elevate and carry rearwardly the beets being harvested. The helicoidal guide rods on the upper shafts hold the beets in upright position and cause and permit the dirt and clods to fall from the beets while they are being conveyed.

What is claimed is:

1. A beet harvester comprising:
   a support structure with ground-engaging means for travel along the surface of the ground;
   a plurality of harvesting units on the support structure and each of said harvesting units including a frame and a pair of elongate and juxtaposed beet-carrying shafts, and a pair of elongate and juxtaposed beet-guiding shafts, said beet-carrying shafts extending forwardly and obliquely downwardly on the frame and in side by side relation to cradle and elevate beets from the ground, said beet-carrying shafts having pointed forward ends to project into the ground and travel beneath the ground surface to initially engage and uplift the beets, said beet-carrying shafts having beet-conveying screws on the periphery thereof and propelling the beets upwardly along the shafts,
   said beet-guiding shafts being in spaced and superposed relation with said beet-carrying shafts and extending substantially parallel therewith, each of said beet-guiding shafts having a helical guiding rod affixed to and spaced from the periphery thereof and also spaced from the other beet-guiding shaft, said helical guiding rods cooperatively engaging the upper portions of the beets conveyed by the screws of said beet-carrying shafts while allowing clods of dirt and mud to fall from the beets;

means journaling and supporting said shafts on the frame of the unit, and drive means revolving all of said beet-carrying shafts and beet-guiding shafts for moving the beets in an upward and rearward direction.

2. The beet harvester according to claim 1 and each of said units also including a pair of elongate beet-confining gates, each extending along a respective beet-carrying shaft, each of said gates having one longitudinal edge adjacent a respective shaft and having the other longitudinal edge spaced from the shaft and hinged to the frame of the unit at a location above the respective beet-carrying shaft to cooperate with the shaft in confining beets thereon, whereby pressure by excessive beets and dirt against the gate is relieved by outward swinging of the gate.

3. The beet harvester according to claim 2 and said gates diverging relative to each other obliquely upwardly and outwardly to support and confine beets therebetween.

4. The beet harvester according to claim 3 and including springs bearing against said gates adjacent the hinges and normally retaining said gates against swinging.

5. The beet harvester according to claim 1 wherein said beet-carrying shafts and said beet-guiding shafts having rear ends spaced upwardly from the ground, and the screws and helical guide rods of said beet-carrying and beet-guiding shafts terminating in spaced relation to said rear ends of the shafts to release the beets and permit discharge of the beets from the shafts, and collector means beneath the upper ends of the shafts to receive the beets discharged therefrom.

6. The beet harvester according to claim 1 and each of said helical guiding rods on a respective beet guiding shaft being spaced from the adjacent helical guiding rod of the other beet-guiding shaft.

7. A beet harvester comprising:

a support structure with ground-engaging means for travel along the surface of the ground;

a plurality of harvesting units on the support structure and each of said units including an elongate inclined frame oriented in a fore and aft direction and pivoted at the rear end of the frame to the supporting structure for upward and downward swinging, each of said units including a pair of lower beet-carrying shafts and a pair of upper beet-guiding shafts parallel to each other and extending obliquely downwardly in a forward direction, each of the lower shafts having a screw thereon of round rod material, the screws on said lower shafts being oriented in opposite directions around the respective screws, a screw on each of the upper shafts and being constructed of rod-shaped material spaced outwardly from the shaft to engage and guide the upper portions of the beets conveyed upwardly along said lower shafts;

a pair of elongate release gates extending longitudinally along the lower shafts and oriented obliquely upwardly and outwardly in a transverse direction, the lower edge of each of the gates being adjacent a respective lower shaft, and the upper edge of each of the gates being hinged to the frame to permit the lower edge to swing outwardly away from the lower shaft;

spring means retaining the gates in close relation with the lower shafts and permitting outward swinging of the gates away from said lower shafts to relieve a buildup of pressure due to excessive beets and mud and clods of dirt adjacent said shafts, said screws having rear ends terminating in spaced relation forwardly of the rear ends of the shafts to permit the beets to be discharged therefrom as the beets are conveyed upwardly and rearwardly along said shafts;

collector means beneath the rear ends of said shafts for receiving and collecting beets discharged from the rear ends of said shafts;

drive means for said shafts and turning the lower beet-carrying shafts in opposite directions relative to each other and also turning said upper shafts in opposite directions relative to each other to lift the beets upon turning of the shafts and screws to minimize damage to the beets;

a pair of support wheels journaled at the front end of each of said units, and adjustable means for moving said wheels upwardly and downwardly with respect to the unit frame whereby to control the vertical position of said unit frame relative to the ground surface;

a pair of juxtaposed digger points on the pair of lower shafts and projecting into the ground to cooperate with each other and rotate with said shafts to uplift beets engaged and cradled therebetween, said digger points traveling at a depth beneath the ground surface which is controlled by the position of said support wheels relative to the unit frame; and lifting means for raising and lowering the front of the unit frame and wheel off the ground to raise said digger points out of the ground and into highway travel position.

* * * * *